US012698677B2

(12) United States Patent
Church et al.

(10) Patent No.: US 12,698,677 B2
(45) Date of Patent: Aug. 4, 2026

(54) KICKBACK DEVICE, MECHANISM, AND ASSOCIATED METHOD FOR ALTERING THE RELEASE POINT OF A COVERING FROM A ROTATABLE MEMBER IN AN ARCHITECTURAL-STRUCTURE COVERING

(71) Applicant: HUNTER DOUGLAS INC., New York, NY (US)

(72) Inventors: Coty Church, Westminster, CO (US); Kevin M. Dann, Englewood, CO (US)

(73) Assignee: Hunter Douglas Inc., New York, NY (US)

( * ) Notice: Subject to any disclaimer, the term of this patent is extended or adjusted under 35 U.S.C. 154(b) by 197 days.

(21) Appl. No.: 18/276,308

(22) PCT Filed: Mar. 3, 2022

(86) PCT No.: PCT/US2022/018594
§ 371 (c)(1),
(2) Date: Aug. 8, 2023

(87) PCT Pub. No.: WO2022/187415
PCT Pub. Date: Sep. 9, 2022

(65) Prior Publication Data

US 2024/0117673 A1 Apr. 11, 2024

Related U.S. Application Data

(60) Provisional application No. 63/157,021, filed on Mar. 5, 2021.

(51) Int. Cl.
*E06B 9/44* (2006.01)
*E06B 9/262* (2006.01)

(52) U.S. Cl.
CPC ........ *E06B 9/44* (2013.01); *E06B 2009/2627* (2013.01); *E06B 2009/445* (2013.01)

(58) Field of Classification Search
CPC ................. E06B 9/44; E06B 2009/445; E06B 2009/2622; E06B 2009/2625; E06B 2009/2627; E06B 9/262
See application file for complete search history.

(56) References Cited

U.S. PATENT DOCUMENTS 2,056,823 A * 10/1936 Brown ...................... E06B 9/34 160/178.3
2,140,049 A * 12/1938 Grauel ...................... E06B 9/34 160/237

(Continued)

FOREIGN PATENT DOCUMENTS

FR 2872850 A1 1/2006
GB 223641 A 10/1924

OTHER PUBLICATIONS

International Search Report and Written Opinion for the International Application No. PCT/US2022/018594, mailed May 13, 2022, 11 pages.

*Primary Examiner* — Johnnie A. Shablack
(74) *Attorney, Agent, or Firm* — Dority & Manning, P.A.

(57) ABSTRACT

A kickback mechanism for altering a release point of a covering from a rotatable member in an architectural-structure covering is disclosed. By altering the release point of the covering from the rotatable member, the covering may be positioned closer to the window when in a fully extended position. In one embodiment, the architectural-structure covering includes a rotatable member, a covering including a top portion coupled to the rotatable member, and a kickback mechanism configured to couple to a rear surface of the covering to alter the release point of the covering from the rotatable member to decrease a horizontal distance between the covering and an underlying architectural structure when the covering is in a fully extended position. In one embodiment, the top portion of the covering wraps about the (Continued)

rotatable member so that a portion of the top portion couples to a rear surface of the covering.

13 Claims, 12 Drawing Sheets

(56) References Cited

U.S. PATENT DOCUMENTS

| | | | | | |
|---|---|---|---|---|---|
| 2,267,869 | A * | 12/1941 | Loehr | E06B 9/34 160/133 |
| 2,300,024 | A * | 10/1942 | Terrell | E06B 9/44 160/390 |
| 2,318,564 | A * | 5/1943 | Snyder | E06B 9/44 160/404 |
| 2,318,565 | A * | 5/1943 | Snyder | E06B 9/44 112/423 |
| 2,723,715 | A * | 11/1955 | Kauffmann | E06B 9/34 160/133 |
| 3,429,355 | A * | 2/1969 | Griesser | E06B 9/34 160/133 |
| 5,320,154 | A * | 6/1994 | Colson | E06B 9/48 160/84.05 |
| 5,456,304 | A * | 10/1995 | Colson | E06B 9/88 160/133 |
| 6,688,369 | B2 * | 2/2004 | Colson | E06B 9/262 160/DIG. 7 |
| 6,729,379 | B1 * | 5/2004 | Nien | E06B 9/384 160/84.05 |
| 7,111,659 | B2 * | 9/2006 | Harper | E06B 9/40 160/84.05 |
| 7,191,816 | B2 * | 3/2007 | Colson | E06B 9/264 160/84.05 |
| 7,549,455 | B2 * | 6/2009 | Harper | E06B 9/323 160/84.05 |
| 7,588,068 | B2 * | 9/2009 | Colson | E06B 9/262 160/84.05 |
| 8,171,640 | B2 * | 5/2012 | Colson | B29C 66/437 29/897 |
| 8,496,768 | B2 * | 7/2013 | Holt | E06B 9/34 160/133 |
| 9,267,324 | B2 * | 2/2016 | Strand | E06B 9/262 |
| 9,353,570 | B2 * | 5/2016 | Smith | E06B 9/40 |
| 9,540,870 | B2 * | 1/2017 | Sasaki | E06B 9/54 |
| 9,702,187 | B2 * | 7/2017 | Holt | E06B 9/56 |
| 9,739,089 | B2 * | 8/2017 | Smith | E06B 9/34 |
| 10,465,442 | B2 * | 11/2019 | Colson | E06B 9/384 |
| 10,633,916 | B2 * | 4/2020 | Huang | E06B 9/60 |
| 11,118,396 | B2 * | 9/2021 | Colson | E06B 9/44 |
| 11,274,492 | B2 * | 3/2022 | Schroeder | E06B 9/323 |
| 11,993,136 | B2 * | 5/2024 | Larin | B60J 1/205 |
| 12,163,375 | B2 * | 12/2024 | Watkins | E06B 9/262 |
| 2006/0157205 | A1 * | 7/2006 | Auger | E06B 9/262 160/84.05 |
| 2014/0262065 | A1 * | 9/2014 | Faller | E06B 9/44 160/84.02 |
| 2014/0262069 | A1 * | 9/2014 | Drew | E06B 9/34 160/405 |
| 2018/0002978 | A1 * | 1/2018 | Colson | E06B 9/264 |
| 2024/0117673 | A1 * | 4/2024 | Church | E06B 9/34 |

* cited by examiner

KICKBACK DEVICE, MECHANISM, AND ASSOCIATED METHOD FOR ALTERING THE RELEASE POINT OF A COVERING FROM A ROTATABLE MEMBER IN AN ARCHITECTURAL-STRUCTURE COVERING

CROSS-REFERENCE TO RELATED APPLICATIONS

This application is a National Phase filing of International Application No. PCT/US2022/018594, filed Mar. 3, 2022, which is a non-provisional of, and claims the benefit of the filing date of, U.S. provisional patent application No. 63/157,021, filed Mar. 5, 2021, entitled “Kickback Device, Mechanism, and Associated Method for Altering the Release Point of a Covering from a Rotatable Member in an Architectural-Structure Covering,” the entirety of each application is incorporated by reference herein.

FIELD OF THE DISCLOSURE

The present disclosure relates generally to the field of architectural-structure coverings, and relates more particularly to a device, mechanism, and/or associated method for altering the release point of a covering from a rotatable member (e.g., a roller tube).

BACKGROUND

Architectural-structure coverings may selectively cover an architectural structure such as, for example, a window, a doorway, a skylight, a hallway, or a portion of a wall. Architectural-structure coverings may include a covering that can be extendable and retractable, for example, vertically extendable or retractable (e.g., able to be lowered or raised, respectively, in a vertical direction) relative to a horizontally-oriented headrail between an extended position and a retracted position for obscuring and exposing the underlying architectural structure.

To move the covering between the extended and retracted positions, some architectural-structure coverings include a rotatable member (e.g., a roller tube) about which the covering may be wrapped to retract the covering (e.g., the retracted position), and unwrapped to extend the covering (e.g., the extended position). For example, some retractable coverings include a flexible covering suspended from the rotatable member. In use, rotation of the rotatable member in a first direction may retract the covering while rotation of the rotatable member in a second, opposite direction may extend the covering.

Some architectural-structure coverings incorporate what is referred to as a reverse-roll-up. In a reverse-roll-up, the covering extends, releases, drops, etc. from a front side of the rotatable member (i.e., the covering releases or drops from the rotatable member on the front or room side of the rotatable member). In use, reverse-roll-up architectural-structure coverings generally provide improved aesthetics as the covering generally aligns with the surrounding molding. In addition, some coverings are constructed in a manner that is not conducive to being rolled off a rear or window side of the rotatable member.

One disadvantage associated with coverings utilizing a reverse-roll-up configuration is that the space or distance between the underlying architectural structure (e.g., window) and the covering, when the covering is in the fully extended position, is greater compared to coverings that use a conventional configuration in which the covering releases from the rear or window side of the rotatable member. That is, in a reverse-roll-up configuration, the covering rolls off or drops from the front or room side of the rotatable member. Thus arranged, the covering is positioned at a greater distance from the underlying architectural structure (e.g., window), so that the distance between the rear of the covering and the front of the window is greater than a rear rolling covering that rolls off of the rear or window side of the rotatable member. As a result, architectural-structure coverings incorporating a reverse-roll-up covering may provide decreased light blocking and privacy as compared to rear rolling coverings.

To address this, some reverse-roll-up architectural-structure coverings incorporate a kickback device or mechanism to alter the release point of the covering from the rotatable member to thereby reduce the degree to which the covering protrudes into a room (e.g., to reduce the distance between the rear of the covering and the front of the window).

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a kickback device, mechanism, and/or associated method, for altering a release point of a covering from a rotatable member in an architectural-structure covering. In use, by altering the release point of the covering from the rotatable member, a reverse-roll-up (e.g., front releasing) covering may be positioned closer to the underlying structure (e.g., window) when in a fully extended position as compared to traditional reverse-roll-designs. For example, the kickback device, mechanism, and/or associated method for altering the release point of the covering from the rotatable member may alter the release point of the covering by approximately 90 degrees or more (e.g., from approximately 3 O’clock to approximately 6 O’clock or more). Thus arranged, the covering is positioned a closer distance (e.g., a horizontal distance or spacing) from the architectural structure (e.g., window).

Disclosed herein is an example embodiment of an architectural-structure covering comprising a rotatable member, a covering, and a kickback mechanism. The covering being arranged and configured in a reverse-roll-up configuration with respect to the rotatable member. The covering including a top portion coupled to the rotatable member for selective rotative movement for extending and retracting the covering during use. The kickback mechanism being arranged and configured to couple to a rear surface of the covering to alter a release point of the covering from the rotatable member to decrease a horizontal distance between the covering and an underlying architectural structure when the covering is in a fully extended position.

In one embodiment, the kickback mechanism comprises the top portion of the covering wrapping about the rotatable member so that a portion of the top portion of the covering is coupled to a rear surface of the covering.

In one embodiment, the covering wraps around the rotatable member from a front or room side of the rotatable member.

In one embodiment, the portion of the top portion of the covering extends downward along the rear surface of the covering.

In one embodiment, the downwardly extending portion of the top portion of the covering is one of glued or taped to the rear surface of the covering.

In one embodiment, a portion of the top portion of the covering is coupled to an arc length of the rotatable member.

In one embodiment, the portion of the top portion of the covering is one of glued or taped along the arc length of the rotatable member.

In one embodiment, the covering is wrapped tightly about the rotatable member.

In one embodiment, the covering is loosely wrapped about the rotatable member so that a space or opening is created between a bottom of the rotatable member and the covering.

In one embodiment, the architectural-structure covering further comprises one or more creases formed in the covering.

In one embodiment, the kickback mechanism includes a secondary piece of fabric arranged and configured to couple to a rear side of the rotatable member to the rear surface of the covering.

In one embodiment, a portion of the secondary piece of fabric extends downward along the rear surface of the covering.

In one embodiment, the downwardly extending portion of the secondary piece of fabric is one of glued or taped to the rear surface of the covering.

In one embodiment, a portion of the secondary piece of fabric is one of glued or taped to the rotatable member.

In one embodiment, a portion of the top portion of the covering is one of glued or taped to the rotatable member.

DETAILED DESCRIPTION

Figure 1:
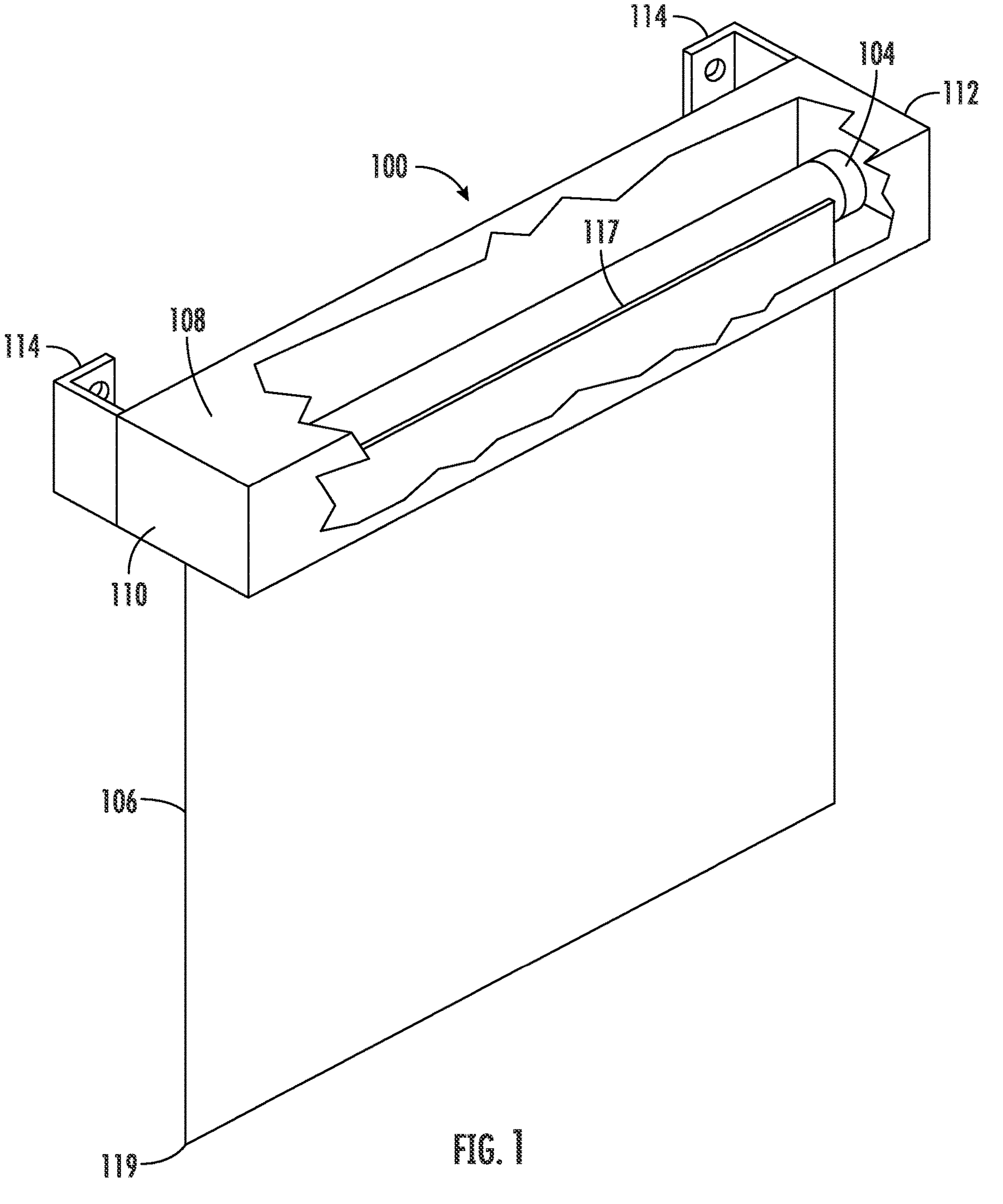
FIG. 1 illustrates a front perspective view of an example embodiment of an architectural-structure covering including a covering shown in an extended position.

Embodiments of a kickback device, mechanism, and/or associated method, for use in an architectural-structure covering in accordance with various features of the present disclosure will now be described more fully hereinafter with reference to the accompanying drawings, in which embodiments of the present disclosure are presented. The kickback device, mechanism, and/or associated method of the present disclosure may, however, be embodied in many different forms and should not be construed as being limited to the embodiments set forth herein. Rather, these embodiments are provided so that this disclosure will convey certain features of the kickback device, mechanism, and/or associated method to those skilled in the art. In the drawings, like numbers refer to like elements throughout unless otherwise noted.

Referring to FIG. 1, a front view of an example architectural-structure covering 100 is illustrated. As shown, the architectural-structure covering 100 may include a headrail 108, which in the illustrated embodiment is a housing having opposed end caps 110, 112 joined by front, back, and top sides to form an open bottom enclosure. The end caps 110, 112 may enclose the ends of the headrail 108 to provide a finished appearance and provide structural support for the components of the architectural-structure covering 100. The headrail 108 may include mounts 114 for mounting the architectural-structure covering 100 to a wall or other structure. Although a particular example of a headrail 108 is shown in FIG. 1, many different types and styles of headrails exist and could be employed in place of the example headrail of FIG. 1. Moreover, in some embodiments, the headrail may be omitted entirely. As such, the present disclosure should be in no way limited to including a headrail or any particular type of headrail.

The architectural-structure covering 100 may also include a rotatable member (e.g., a roller tube) 104 rotatably coupled between the end caps 110, 112, and a covering 106. In the illustrated example, the covering 106 has an upper edge or portion 117 mounted to the rotatable member 104 and a lower, free edge 119. As will be readily appreciated by one of ordinary skill in the art, the covering 106 of the architectural-structure covering 100 may be suspended from the rotatable member 104 and may be configured to be vertically extended and retracted relative to the headrail 108 between an extended position (shown in FIG. 1), wherein the covering 106 may partially or entirely cover an architectural structure such as, for example, a window, a doorway, a skylight, a hallway, a portion of a wall, etc., and a retracted position, wherein the covering 106 may be retracted relative to the rotatable member 104. Although not shown, any appropriate known or heretofore to be developed drive mechanism can be provided to move the covering 106 between the extended and retracted positions. As illustrated, the covering 106 may be arranged and configured to operate in a reverse-roll-up configuration so that the covering 106 extends from a front or room side of the rotatable member 104.

As will be generally understood by one of ordinary skill in the art, in use, rotational movement of the rotatable member 104 about a longitudinally-extending axis moves the covering 106 between the extended and retracted positions. For example, rotation of the rotatable member 104 in a first direction (e.g., counter-clockwise direction in FIG. 1) may retract the covering 106 while rotation of the rotatable member 104 in a second, opposite direction (e.g., clockwise direction in FIG. 1) may extend the covering 106. The covering 106 may be coupled to and wrappable about the rotatable member 104, so that rotation of the rotatable member 104 causes the covering 106 to wrap around or unwrap from the rotatable member 104 depending upon the direction of rotation. As illustrated in FIG. 1, due to the structure of some coverings, the covering 106 is wrapped about or unwrapped from the front or room side of the rotatable member 104, with a rear or window side of the rotatable member 104 positioned intermediate the front or room side of the rotatable member 104 and the associated underlying architectural structure (e.g., window).

The covering 106 may be constructed of any of a variety of different types of materials. For example, the covering 106 may be constructed from natural and/or synthetic materials, including fabrics, polymers, and/or other suitable materials. Fabric materials may include woven, non-woven, knits, or other suitable fabric types. The covering 106 may have any suitable level of light transmissivity. For example, the covering 106 may be constructed of transparent, translucent, and/or opaque materials to provide a desired ambience or decor in an associated room.

Figure 2:
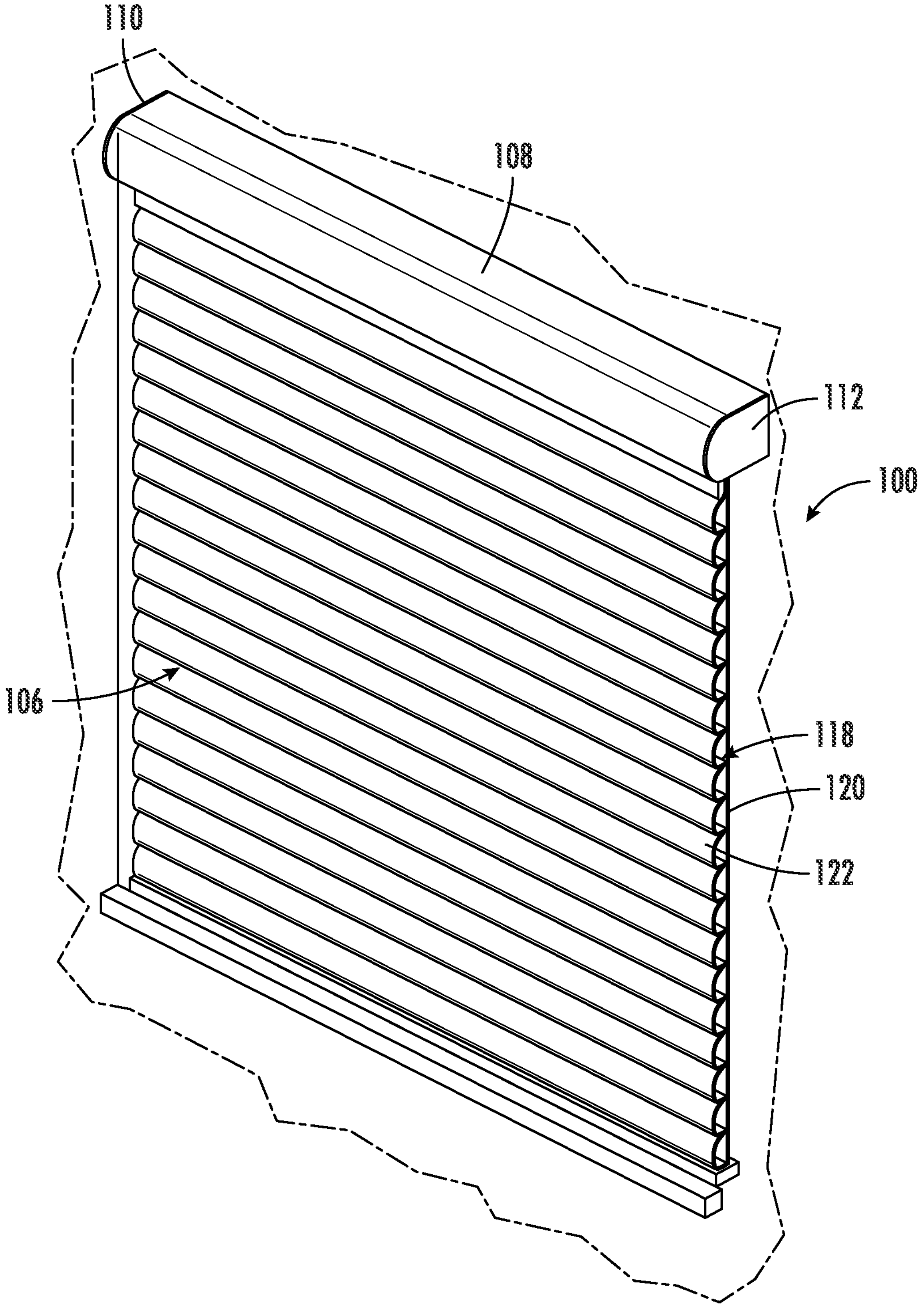
FIG. 2 illustrates a front perspective view of an alternate example embodiment of an architectural-structure covering including a covering shown in an extended position.

One known type of covering utilizing a reverse-roll-up configuration is Sonnette®, which is manufactured and sold by Hunter Douglas, Inc. Referring to FIG. 2, an example embodiment of a Sonnette® style covering utilizing a reverse-roll-up configuration is illustrated. As illustrated, the covering 106 includes a rollable, cellular structure. As illustrated, the covering 106 may include a plurality of cells 118, which may be defined at least in part by a rear support sheet 120, a vane material 122, and an optional cellular support member (not shown). In use, in the extended position, the vane material 122 moves away from the rear support sheet 120 creating an opened appearance. Additional information on the rollable, cellular structure can be found in U.S. Pat. No. 10,030,444, issued on Jul. 24, 2018, entitled Covering for Architectural Opening Including Cell Structures Biased to Open; U.S. Pat. No. 9,995,083, issued Jun. 12, 2018, entitled Covering for Architectural Opening Including Thermoformable Slat Vanes; U.S. Published Patent Application No. 2018/0002978, filed on Jan. 30, 2017, entitled Architectural Covering and Method of Manufacturing, and U.S. Pat. No. 10,774,584, issued on Sep. 15, 2020, entitled Battened Roller Covering, all of which are assigned to Hunter Douglas, Inc, the entire contents of each patent and/or patent application is hereby incorporated by reference.

While various kickback devices, mechanisms, and/or associated methods, may be described in use with a particular covering, it should be understood that the various kickback devices, mechanisms, and/or associated methods, may be used in connection with any architectural-structure covering used in a reverse-roll-up configuration. As such, the present disclosure should not be limited to any particular type of covering unless explicitly claimed.

Referring to FIG. 1, for the sake of convenience and clarity, terms such as “front,” “rear,” “top,” “bottom,” “up,” “down,” “vertical,” “horizontal”, “interior,” “inner,” and “outer” may be used herein to describe the relative placement and orientation of various components and portions of the architectural-structure covering 100, each with respect to the geometry and orientation of the architectural-structure covering 100 as they appear in FIG. 1. Said terminology will include the words specifically mentioned, derivatives thereof, and words of similar import.

Figure 3:
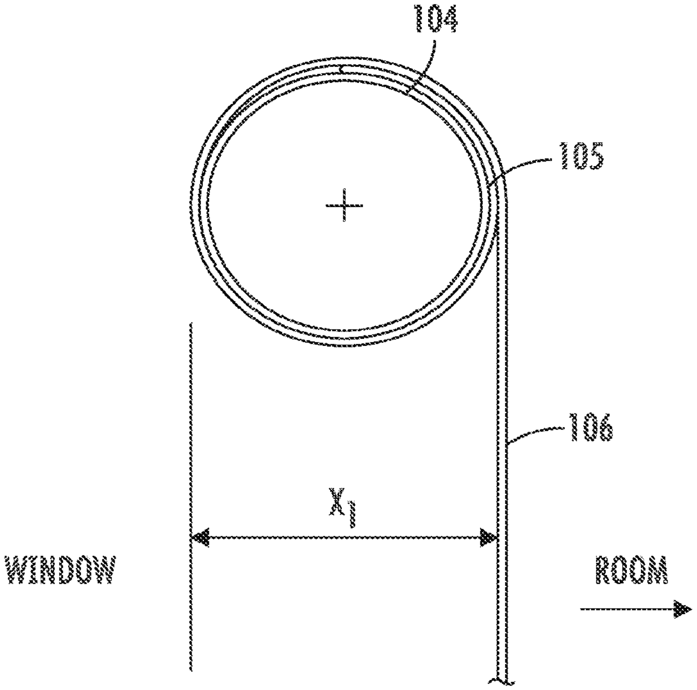
FIG. 3 PRIOR ART
FIG. 3 illustrates a cross-sectional view of a conventional covering extending from a front side of a rotatable member in a reverse-roll-up configuration.

Referring to FIG. 3, a schematic illustration is provided of a covering 106 extending from a rotatable member 104 in a reverse-roll-up configuration. As schematically illustrated in this reverse-roll-up configuration, the covering 106 extends from the rotatable member 104 along a front or room side 105 thereof. As schematically illustrated in FIG. 3, in a conventional architectural-structure covering utilizing a reverse-roll-up configuration, the covering 106 extends from the front side 105 of the rotatable member 104 at a position approximating 3 O’clock of the rotatable member 104. Thus arranged, the covering 106 is positioned a distance $X_1$ (e.g., a horizontal distance or spacing) from the architectural structure such as, for example, a window.

In accordance with one or more features of the present disclosure, and as will be described in greater detail below, the architectural-structure covering may utilize a portion of the covering (e.g., a portion of the covering’s fabric) and/or a secondary piece of fabric to couple to the rotatable member and to a rear surface of the covering to alter a release point of the covering from the architectural-structure covering. In use, the portion of the covering’s fabric and/or the secondary piece of fabric may be coupled to the rotatable member such as, for example, wrapped and/or glued, taped, etc. about the rotatable member. The fabric may provide a partial or full wrap of the rotatable member. For example, in one embodiment, the covering may be wrapped around the rotatable member from the front side of the rotatable member. Thereafter, the fabric may extend partially downward along the rear surface of the covering. The fabric may then be coupled (e.g., glued, taped, etc.) to the rear side of the covering and to the rotatable member.

In one or more embodiments, one or more optional creases may be employed in the fabric to create a hinge point for the fabric to bend around while the covering is being wrapped and unwrapped from the rotatable member. Alternatively, in one or more embodiments, the fabric may be arranged and configured to fold onto itself, creating an inherent crease rather than needing to be creased during the manufacturing process. In either implementation, the crease may be formed by the act of rolling the fabric around the rotatable member, the hinge point becoming the area adjacent to the coupling line (e.g., adhesive line).

Thus arranged, in the fully extended position, the release point or position (terms used interchangeably herein without the intent to limit or distinction) of the covering from the rotatable member can be controlled. For example, as will be shown and described in greater detail, in one embodiment, the release point may be located at the bottom of the rotatable member (i.e., at approximately 6 O’clock of the rotatable member, also referred to as bottom dead center), so that it is aligned with a central longitudinal axis of the rotatable member. Alternatively, the release point may be positioned on either side of this location (fore or aft of bottom dead center) by a desired amount.

Thus arranged, when used with a reverse-roll-up covering configuration, the release point of the covering relative to the rotatable member can be adjusted to decrease the distance between the rear surface of the covering and the rear or window side of the rotatable member. In addition, in accordance with one or more features of the present disclosure, the kickback device, mechanism, and/or associated method may be incorporated without any additional parts.

Figure 4A:
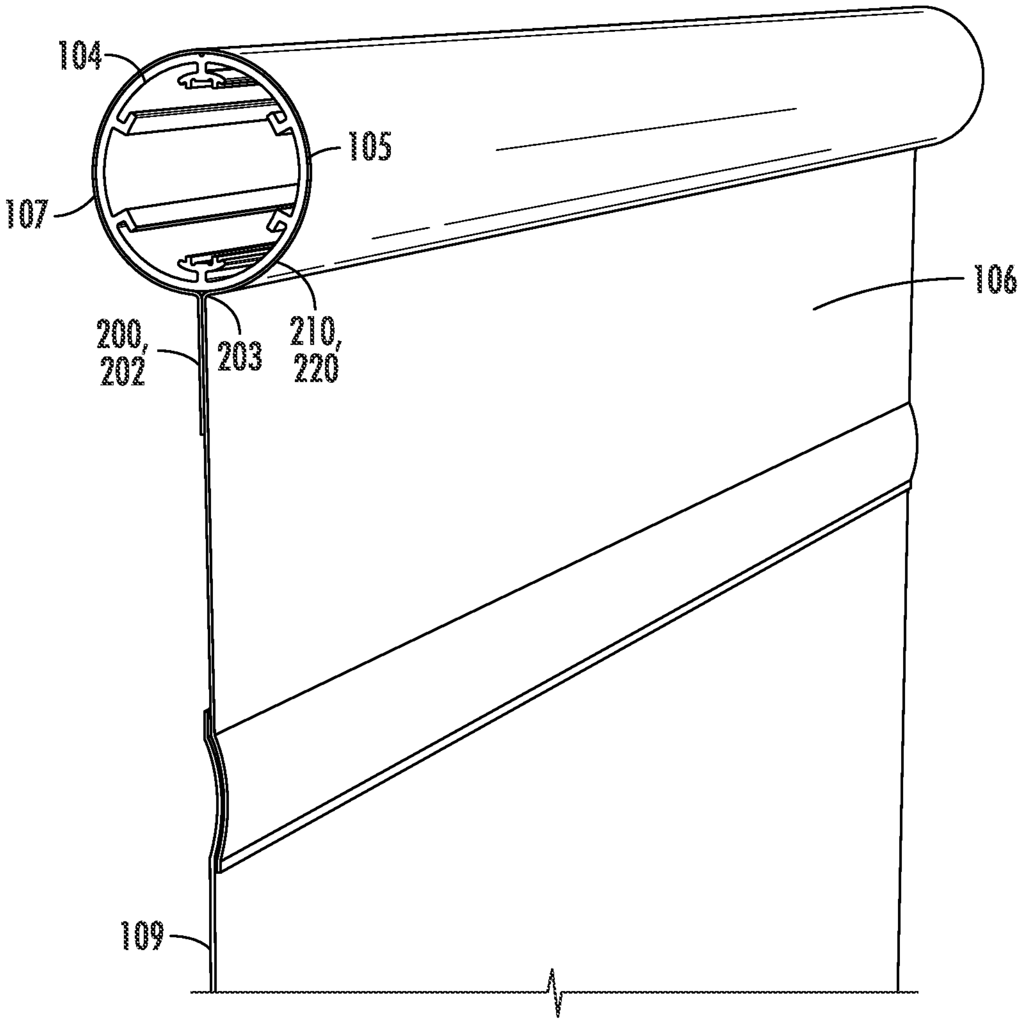
FIG. 4A illustrates a perspective view of an example embodiment of a covering coupled to a rotatable member in accordance with one or more features of the present disclosure.
Figure 4B:
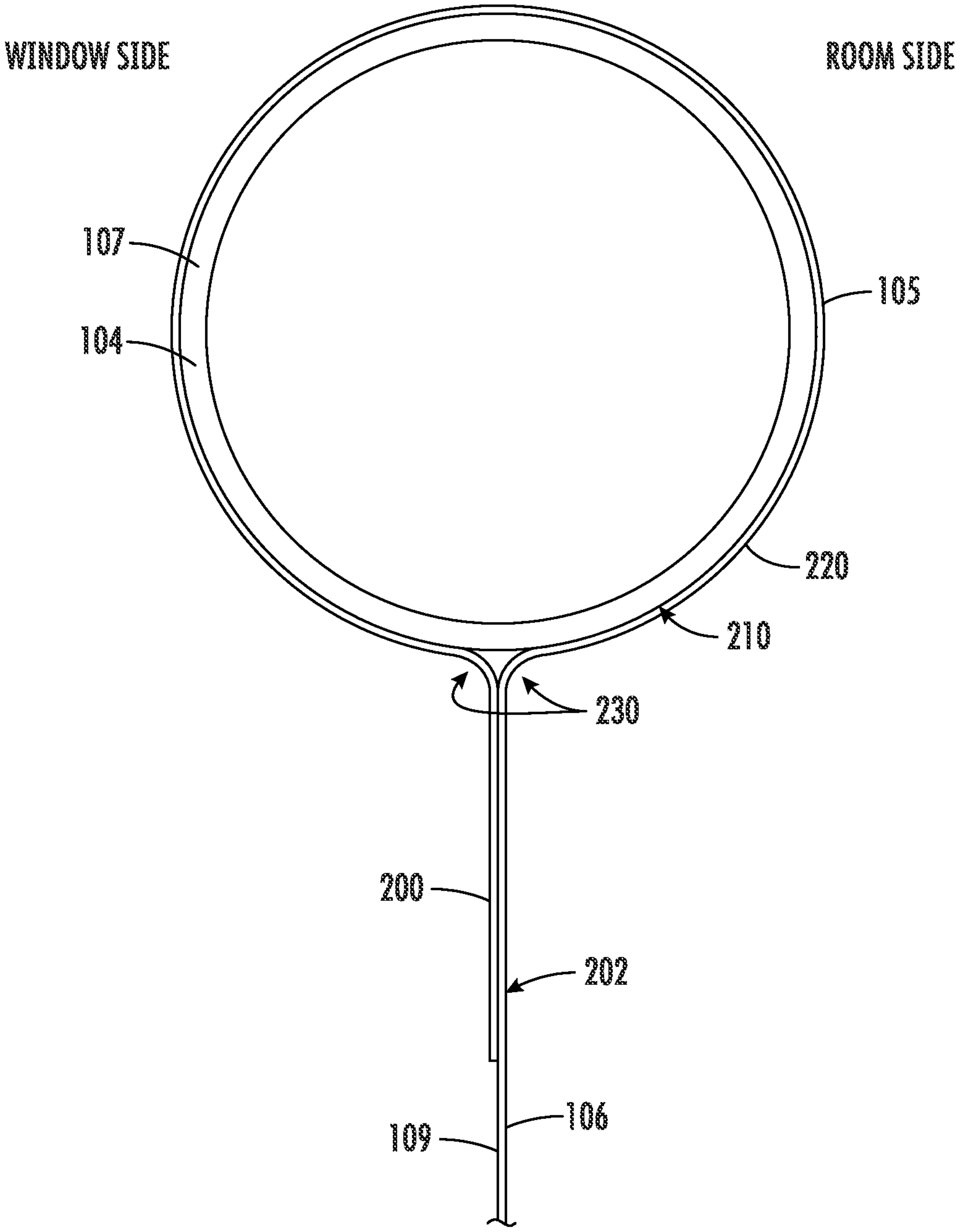
FIG. 4B illustrates a cross-section view of the covering and rotatable member shown in FIG. 4A.

Referring to FIGS. 4A and 4B, in accordance with one or more features of the present disclosure, the covering 106 may be completely wrapped about the rotatable member 104. For example, as illustrated, in one embodiment, the covering 106 may be wrapped around the rotatable member 104 from the front or room side 105 of the rotatable member 104. Thereafter, a portion 200 of the covering 106 may extend partially downward along a rear surface 109 of the covering 106. In use, the downwardly extending portion 200 of the covering 106 (e.g., portion of the covering extending downwardly from the rear or window side 107 of the rotatable member 104) may be coupled (e.g., glued, taped, etc.) to the rear surface 109 of the covering 106 after being wrapped about the rotatable member 104 starting with the front or room side 105 of the rotatable member 104 (e.g., an adhesive or tape 202 may be used to couple the downwardly extending portion 200 of the covering 106 to the rear surface 109 of the covering 106).

In addition, as best illustrated in FIG. 4B, the covering 106 may be coupled (e.g., glued, taped, etc.) to the front side 105 of the rotatable member 104. That is, an adhesive or tape 210 may be used to couple a front portion 220 of the covering 106 along an arc length of the rotatable member 104.

In addition, in one embodiment, one or more creases 230 may be formed in the covering 106. Thus arranged, by coupling (e.g., adhering, taping, etc.) a portion 220 of the covering 106 to the rotatable member 104, and by adhering or taping a downwardly extending portion 200 of the covering 106 to the rear surface 109 of the covering 106, and incorporating one or more optional creases 230, the release point of the covering 106 from the rotatable member 104 may be controlled and/or set. For example, as illustrated in the embodiment of FIGS. 4A and 4B, the release point may be aligned with a central longitudinal axis of the rotatable member 104 (i.e., bottom dead center). As such, the distance from the rear side 107 of the rotatable member 104 to the release point of the covering 106 may be less than conventional coverings wherein the release point extends from the front side 105 of the rotatable member 104.

Moreover, by wrapping the covering 106 completely around the rotatable member 104 and extending a portion 200 of the covering 106 vertically downward to adhere to the rear surface 109 of the covering 106, the bond between the portion 200 of the covering 106 and the rear surface 109 of the covering 106, in the vertical orientation, enhances the ability of the covering 106 to maintain shear loads, thus providing an improved connection.

Figure 5:
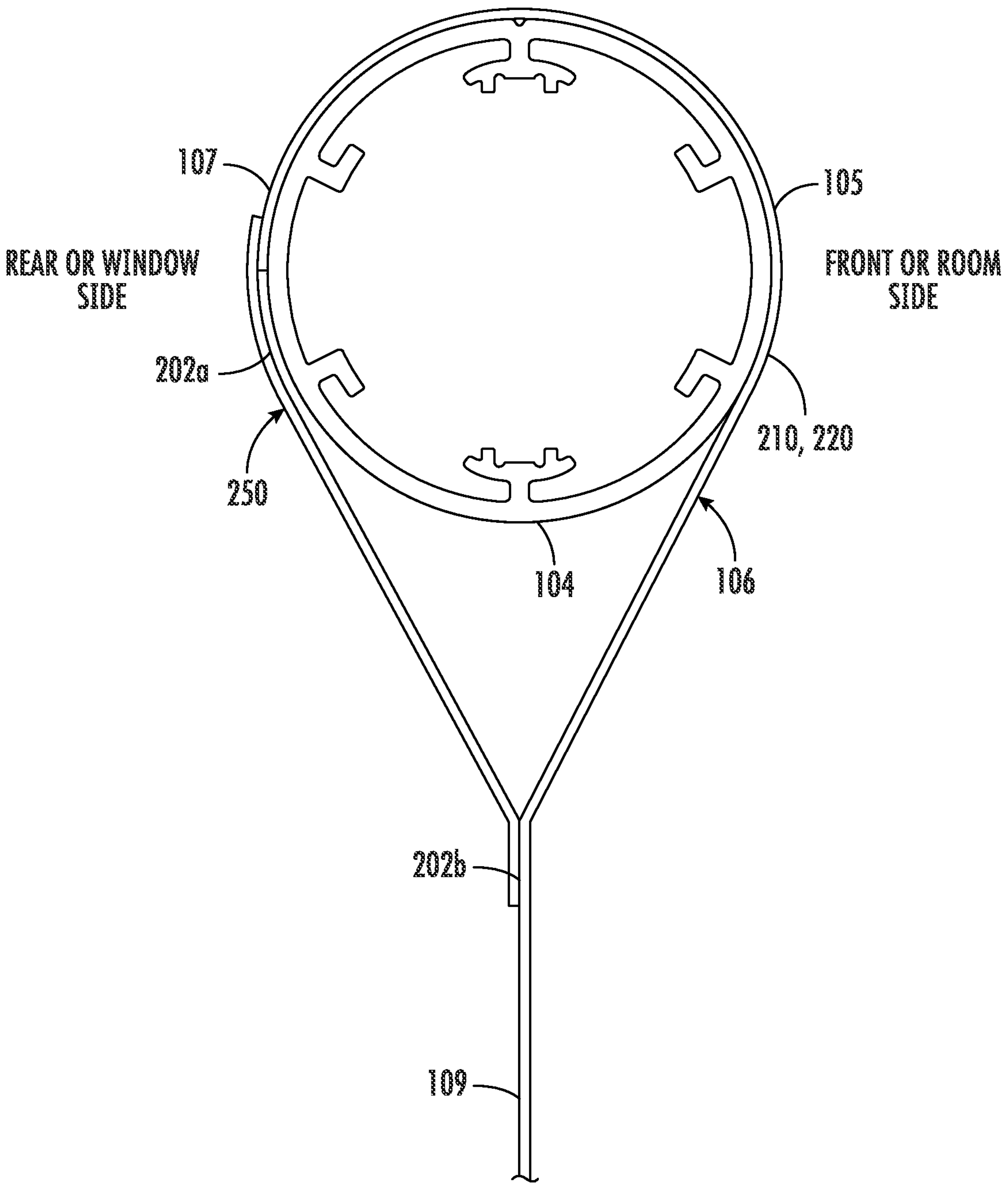
FIG. 5 illustrates a cross-sectional view of an alternate example embodiment of a covering coupled to a rotatable member in accordance with one or more features of the present disclosure.
Figure 8:
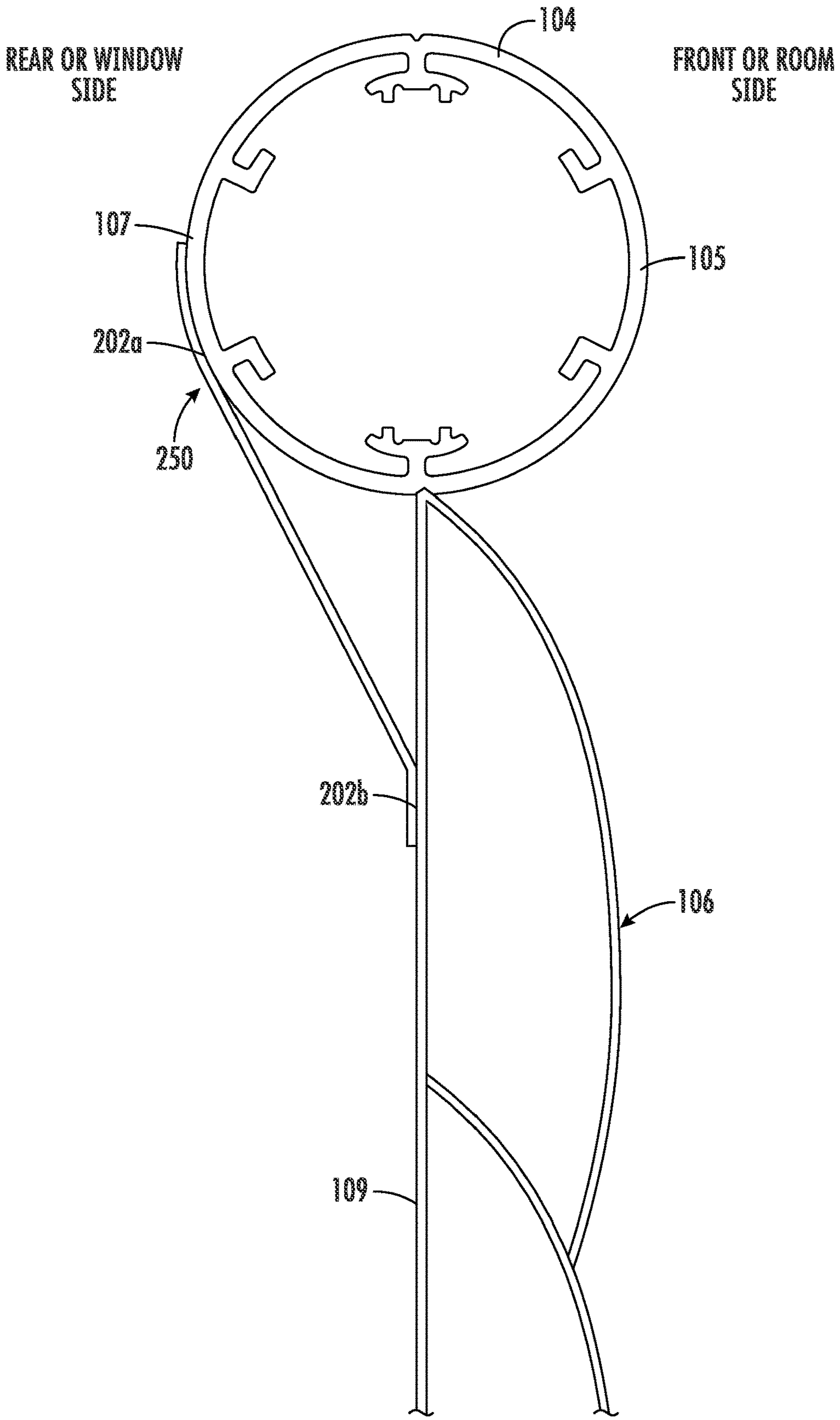
FIG. 8 illustrates a cross-sectional view of an alternate example embodiment of a covering coupled to a rotatable member in accordance with one or more features of the present disclosure.

Alternatively, referring to FIG. 5, in an alternate embodiment, a secondary piece of fabric 250 may be used to couple between portions of the covering 106 and/or the rotatable member 104. For example, a portion 220 of the covering 106 may be coupled (e.g., glued, taped, etc.) to the rotatable member 104 as previously described. Instead of completely wrapping the covering 106 about the rotatable member 104 so that a portion 200 of the covering 106 extends vertically downward to the rear surface 109 of the covering 106, in this embodiment a secondary piece or strip of fabric 250 may be used to couple (e.g., glue, tape, etc.) at one end to a rear side 107 of the rotatable member 104 and at an opposite end to the rear surface 109 of the covering 106. Thus, instead of completely wrapping the covering 106 about the rotatable member 104, a secondary piece of fabric 250 may be coupled to the rear side 107 of the rotatable member 104 and to the rear surface 109 of the covering 106 via, for example, a layer of adhesive or tape 202*a*, 202*b*, respectively. Referring to FIG. 8, in an alternate embodiment, a secondary piece of fabric 250 is illustrated to similarly couple between segments of a cellular panel (e.g., Sonnette® style) covering 106.

In one embodiment, one or more creases may be incorporated, as previously described. Alternatively, in one embodiment, the secondary fabric 250 may be sufficiently thin enough so as to be arranged and configured to fold onto itself, thereby creating a crease on its own rather than needing to be creased during the manufacturing process.

Figure 6:
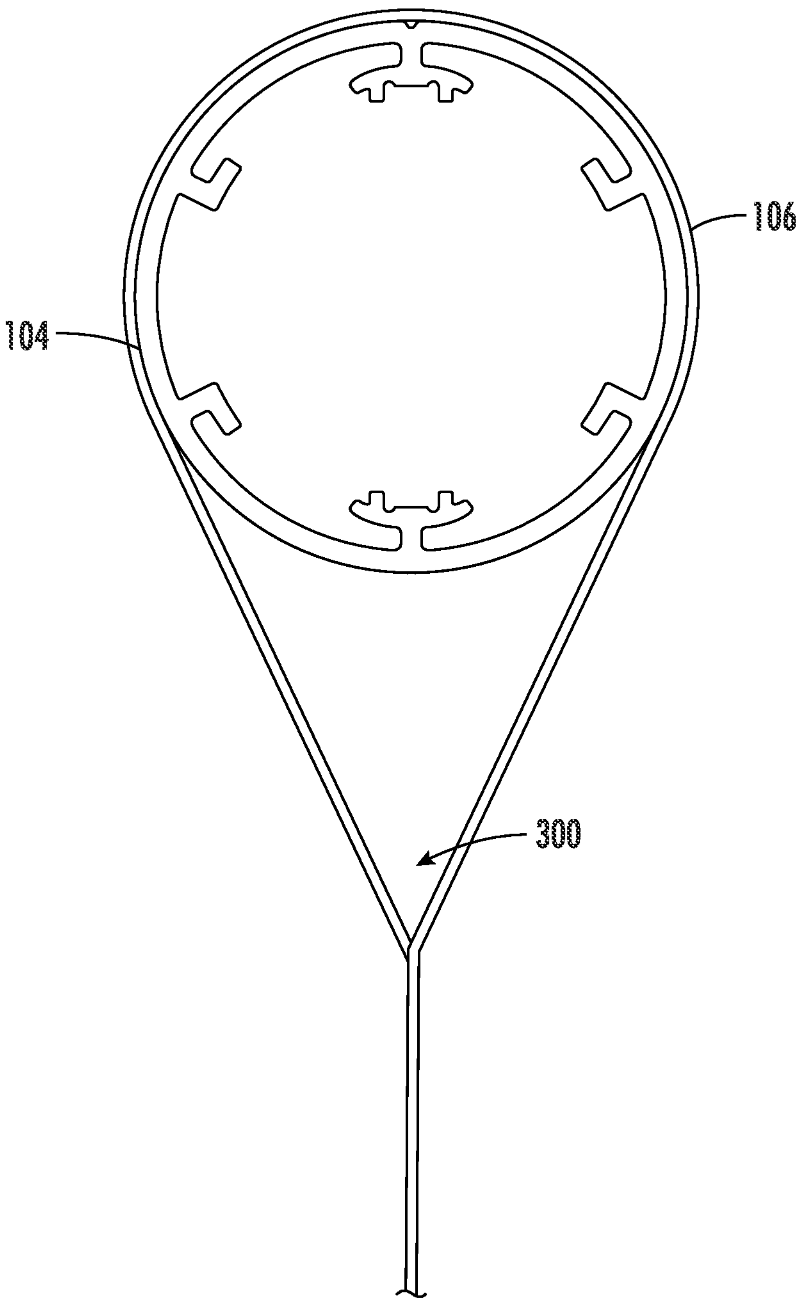
FIG. 6 illustrates a cross-sectional view of an alternate example embodiment of a covering coupled to a rotatable member in accordance with one or more features of the present disclosure.
Figure 7:
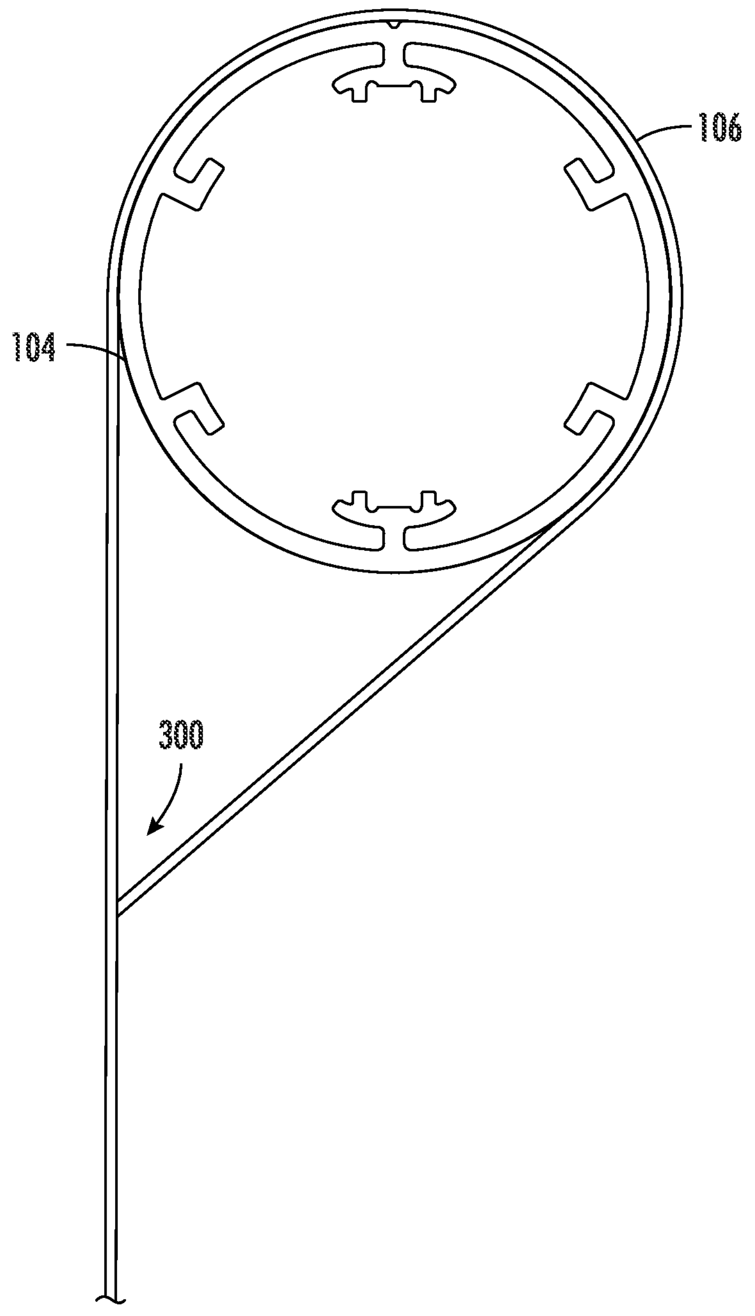
FIG. 7 illustrates a cross-sectional view of an alternate example embodiment of a covering coupled to a rotatable member in accordance with one or more features of the present disclosure.

In either implementation, as illustrated, the covering 106 may be wrapped tightly about the rotatable member 104 (e.g., covering 106 can be held tight around a circumference of the rotatable member 104). Alternatively, referring to FIGS. 6 and 7, the covering 106 may be only partially wrapped about the rotatable member 104 so that it includes a loosened portion (e.g., rather than wrapping the covering 106 tightly about the circumference of the rotatable member 104, a space or opening 300 may be provided between the covering 106 and the rotatable member 104). As illustrated, this causes the covering 106 to form a V-shaped space or opening and crease 300 below the bottom of the rotatable member 104. Referring to FIG. 6, in one embodiment, the V-shaped space and crease 300 may be aligned with a central longitudinal axis of the rotatable member 104 (i.e., bottom dead center position). Alternatively, referring to FIG. 7, by controlling the coupling of the covering 106 to the rotatable member 104, the V-shaped space and crease 300 may be moved rearwardly, for example, toward the rear or window side of the architectural-structure covering.

In use, the incorporation of a V-shaped space and crease 300 may provide additional tolerance to accommodate any potential measurements errors that may occur in the field. In addition, the V-shaped space and crease 300 enables the covering 106 to rotate about a larger radius when swinging through the bottom dead center of the rotatable member 104 and limits the amount of lift a bottom rail (not shown) may experience. This assists in creating a sweeping back action of the covering 106 and the bottom rail rather than a lift when the covering 106 is rotated past the bottom dead center. In other words, lift of the bottom rail at full shade deployment is minimal with the embodiment of FIG. 7.

Figure 9:
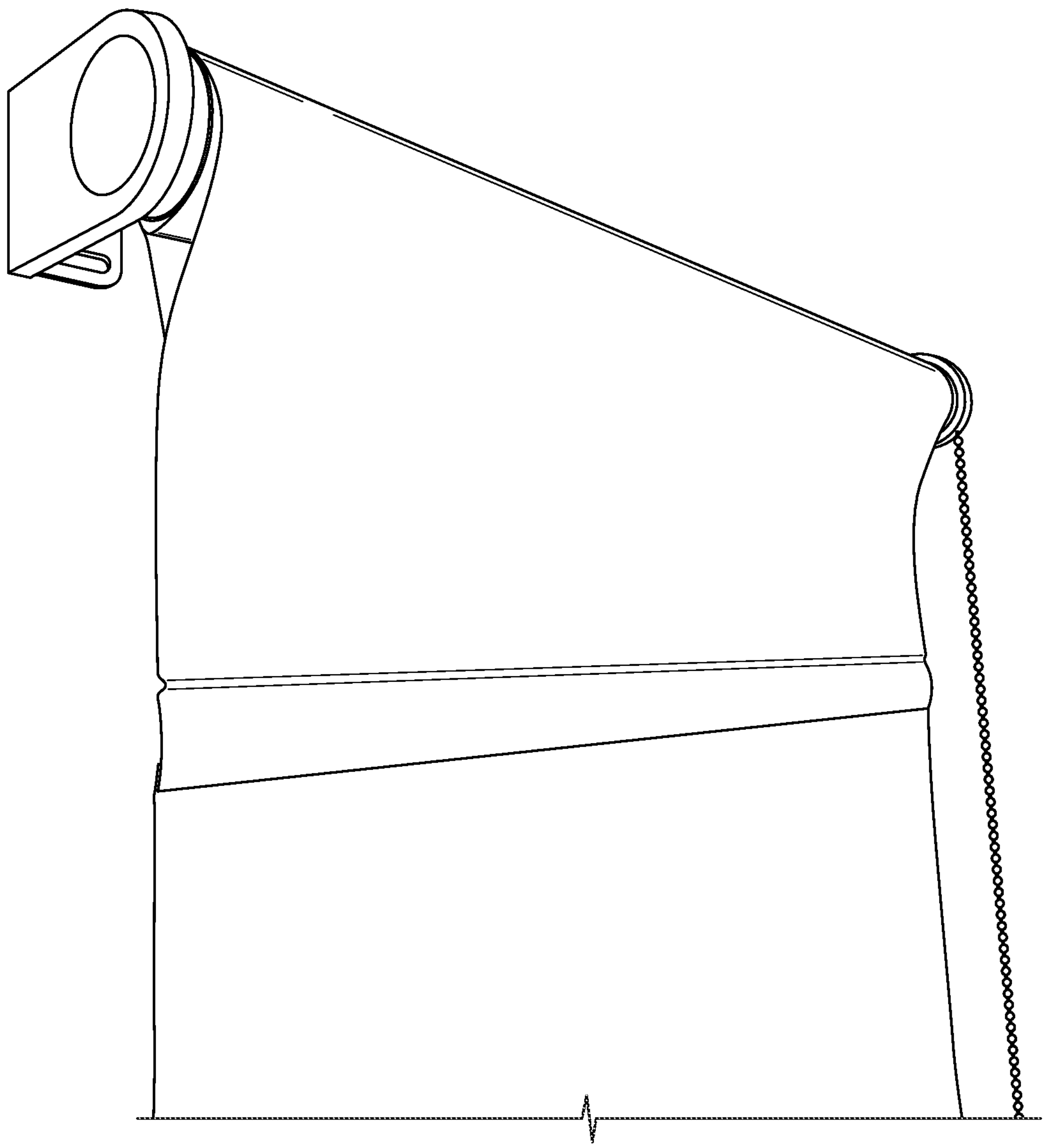
FIGS. 9-11 illustrate various views of a covering coupled to a rotatable member in accordance with one or more features of the present disclosure.
Figure 10:
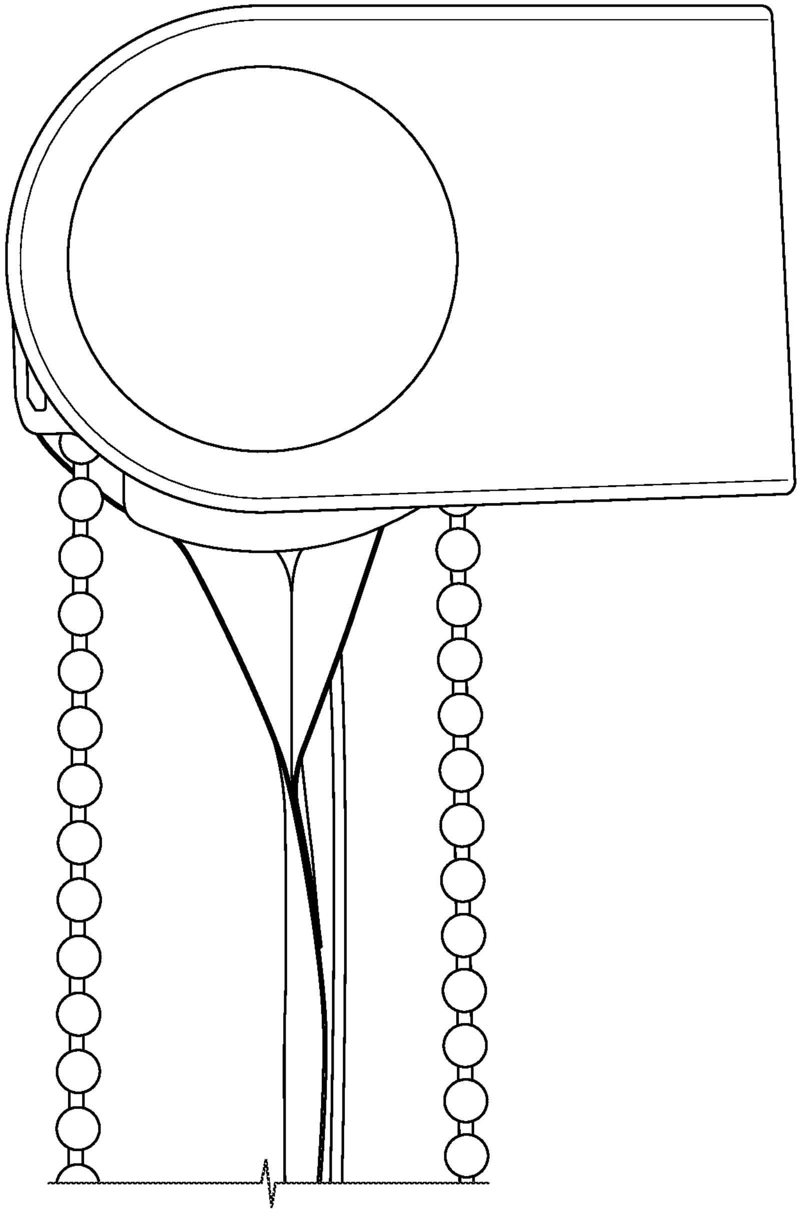
Figure 11:
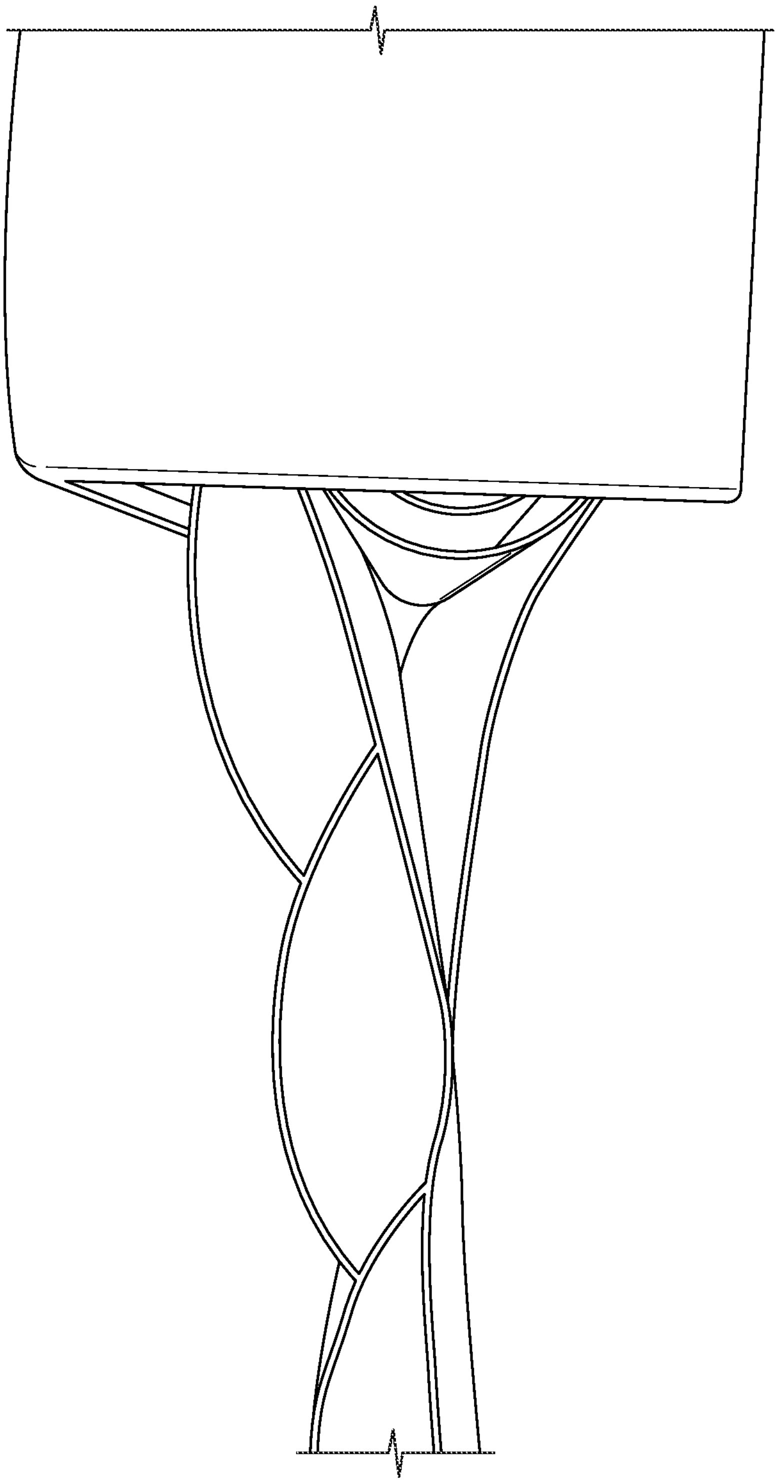

In accordance with one or more features of the present disclosure, the kickback device, mechanism, and/or associated methods as described herein enable control over the release point of the covering 106 from the rotatable member 104 to decrease a horizontal distance between the covering 106 and an underlying architectural structure (e.g., window) when the covering is in a fully extended position. For example, FIGS. 9-11 illustrate various images illustrating the reduced distance between the covering 106 and an underlying architectural structure (e.g., window).

Moreover, in accordance with one or more features of the present disclosure, in addition to controlling the release point of the covering 106 from the rotatable member 104, the kickback device, mechanism, and/or associated methods of the present disclosure, facilitates the use of automated equipment to quickly and easily incorporate this feature into a covering 106 during the covering manufacturing process. Alternatively, the kickback device, mechanism, and/or associated method, can be incorporated by manual manufacturing processes.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments or configurations. Moreover, the following claims are hereby incorporated into this Detailed Description by this reference, with each claim standing on its own as a separate embodiment of the present disclosure.

The phrases “at least one”, “one or more”, and “and/or”, as used herein, are open-ended expressions that are both conjunctive and disjunctive in operation. For example, each of the expressions “at least one of A, B and C”, “at least one of A, B, or C”, “one or more of A, B, and C”, “one or more of A, B, or C” and “A, B, and/or C” means A alone, B alone, C alone, A and B together, A and C together, B and C together, or A, B and C together.

The term “a” or “an” entity, as used herein, refers to one or more of that entity. As such, the terms “a” (or “an”), “one or more” and “at least one” can be used interchangeably herein.

The use of “including,” “comprising,” or “having” and variations thereof herein is meant to encompass the items listed thereafter and equivalents thereof as well as additional items. Accordingly, the terms “including,” “comprising,” or “having” and variations thereof are open-ended expressions and can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader’s understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order, and relative sizes reflected in the drawings attached hereto may vary.

The invention claimed is:

1. An architectural-structure covering comprising:

a rotatable member having a front side and a rear side opposite the front side, the front side configured to face away from an underlying architectural structure and the rear side configured to face the underlying architectural structure; and a covering arranged and configured in a reverse-roll-up configuration with respect to the rotatable member such that the covering is configured to extend from the front side of the rotatable member, the covering including a top portion coupled to the rotatable member for selective rotative movement for extending and retracting the covering during use, the covering further including a front surface and a rear surface, the rear surface configured to face the underlying architectural structure, wherein a rear portion of the top portion of the covering is coupled to the rear surface of the covering to form a kickback mechanism to alter a release point of the covering from the rotatable member to decrease a horizontal distance between the covering and the underlying architectural structure when the covering is in a fully extended position, wherein a front portion of the top portion of the covering is coupled to an arc length of the rotatable member, the arc length positioned along the front side of the rotatable member when the covering is in a fully extended position, wherein the rear portion of the top portion of the covering is coupled to the rear surface of the covering along a rear coupling line and the front portion of the top portion of the covering is coupled to the arc length of the rotatable member along a front coupling line, wherein one or more creases are formed in the covering, the one or more creases including a first crease and a second crease, and wherein the first crease creates a first hinge point adjacent to the rear coupling line and the second crease creates a second hinge point adjacent to the front coupling line.

2. The architectural-structure covering of claim 1, wherein the covering wraps around the rotatable member from the front side of the rotatable member.

3. The architectural-structure covering of claim 1, wherein the front portion of the top portion of the covering is one of glued or taped along the arc length of the rotatable member.

4. The architectural-structure covering of claim 1, wherein the covering is wrapped about the rotatable member such that the covering wraps about a circumference of the rotatable member in the fully extended position.

5. The architectural-structure covering of claim 1, wherein the covering is wrapped about the rotatable member so that a space or opening is created between a bottom of the rotatable member and the covering in the fully extended position.

6. The architectural-structure covering of claim 1, wherein the rear portion of the top portion of the covering extends downward along the rear surface of the covering.

7. The architectural-structure covering of claim 6, wherein the downwardly extending rear portion of the top portion of the covering is one of glued or taped to the rear surface of the covering.

8. An architectural-structure covering comprising:

a rotatable member having a front side and a rear side opposite the front side, the front side configured to face away from an underlying architectural structure and the rear side configured to face the underlying architectural structure;

a covering arranged and configured in a reverse-roll-up configuration with respect to the rotatable member such that the covering is configured to extend from the front side of the rotatable member, the covering including a top portion coupled to the rotatable member for selective rotative movement for extending and retracting the covering during use, the covering further including a front surface and a rear surface, the rear surface configured to face the underlying architectural structure; and a secondary piece of fabric coupled to the rear side of the rotatable member and to the rear surface of the covering, the secondary piece of fabric forming a kickback mechanism to alter a release point of the covering from the rotatable member to decrease a horizontal distance between the covering and the underlying architectural structure when the covering is in a fully extended position, wherein a front portion of the top portion of the covering is configured to be coupled to an arc length of the rotatable member, the arc length positioned along a front side of the rotatable member when the covering is in a fully extended position and the covering wrapping from the arc length to the rear side of the rotatable member over a top of the rotatable member.

9. The architectural-structure covering of claim 8, wherein a first portion of the secondary piece of fabric extends downward along the rear surface of the covering.

10. The architectural-structure covering of claim 9, wherein the downwardly extending first portion of the secondary piece of fabric is one of glued or taped to the rear surface of the covering.

11. The architectural-structure covering of claim 10, wherein a second portion of the secondary piece of fabric is one of glued or taped to the rotatable member.

12. The architectural-structure covering of claim 11, wherein a portion of the top portion of the covering is one of glued or taped to the arc length of the rotatable member.

13. An architectural-structure covering comprising:

a rotatable member having a front side and a rear side opposite the front side, the front side configured to face away from an underlying architectural structure and the rear side configured to face the underlying architectural structure;

a covering arranged and configured in a reverse-roll-up configuration with respect to the rotatable member such that a release point of the covering extends from the front side of the rotatable member, the covering including a top portion coupled to the rotatable member for selective rotative movement for extending and retracting the covering during use, the covering further including a front surface and a rear surface, the front surface configured to face away from the underlying architectural structure and the rear surface configured to face the underlying architectural structure; and a kickback mechanism arranged and configured to couple to the rear surface of the covering to alter the release point of the covering from the rotatable member to an altered release point, wherein the covering wraps around the rotatable member opposite the kickback mechanism when the covering is in a fully extended position, and wherein a first horizontal distance between the release point and the underlying architectural structure is greater than a second horizontal distance between the altered release point and the underlying architectural structure.

* * * * *